July 18, 1961 C. G. SCHNEIDER 2,992,691
WEIGHING APPARATUS

Filed June 23, 1958 2 Sheets-Sheet 1

INVENTOR.
Clarence G. Schneider
BY
Merriam, Lorch & Smith
ATTORNEYS

INVENTOR.
Clarence G. Schneider
BY
Merriam, Lorch & Smith
ATTORNEYS

United States Patent Office 2,992,691
Patented July 18, 1961

2,992,691
WEIGHING APPARATUS
Clarence G. Schneider, Valparaiso, Ind., assignor to Inland Steel Company, Chicago, Ill., a corporation of Delaware
Filed June 23, 1958, Ser. No. 743,709
4 Claims. (Cl. 177—210)

This invention relates to weighing systems and more particularly it relates to a weighing apparatus for molten metal ladles and similar loads.

It is conventional practice to use load cells, hereinafter more fully described, in weighing heavy objects, such as trucks, large crates and boxes, structural steel members, and the like. In the usual arrangement four such cells are used, positioned more or less under the corners of a square or rectangular platform on which the object to be weighed is placed. While such an arrangement is entirely adequate in most instances, it is unsatisfactory for weighing ladles full of molten metal because of the possibility of damage to the load cells, which are expensive and easily damaged by splashing molten metal.

The weighing apparatus of this invention affords a means of weighing such ladles without the possibility of injury to the load cells, by suspending the ladle between two weighing assemblies positioned on diametrically opposite sides of the ladle. This arrangement is compact and efficient requiring a minimum amount of space and a minimum number of load cells, while at the same time allowing the load cells to be so positioned that they are not exposed to possible damage.

The apparatus of the invention will be better understood from the following detailed description thereof, in which reference is made to the accompanying diagrams, wherein.

Figure 1:
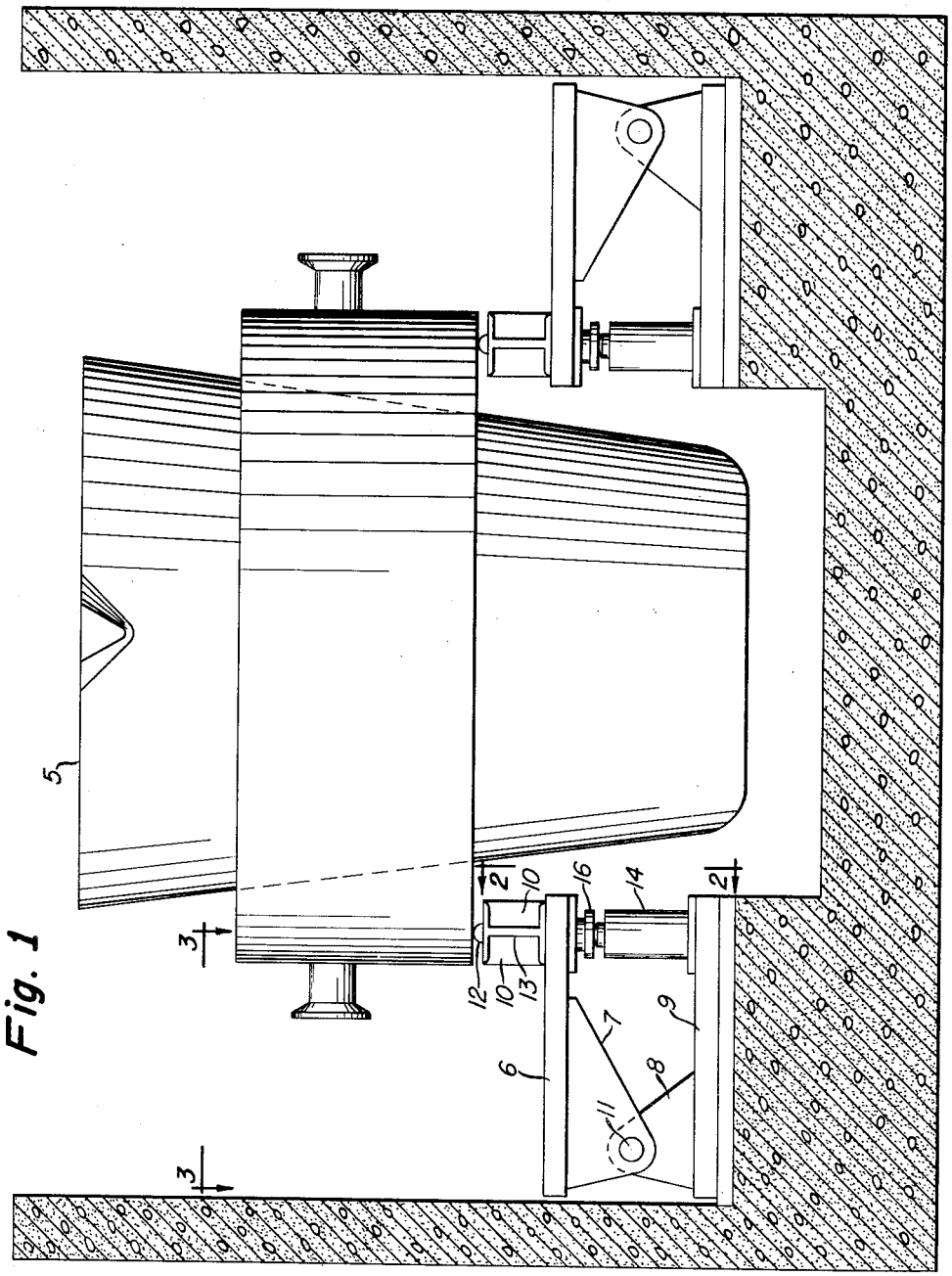
FIGURE 1 is a side view of the apparatus showing a ladle in position for weighing.

More specifically, FIGURE 1 shows a molten metal ladle 5 suspended between two weighing assemblies. Each assembly has a rigid top horizontal plate 6 to which there are attached a number of parallel upper trunnion blocks, e.g., 7, located at spaced intervals perpendicular to the bottom surface of plate 6. There are a corresponding number of vertical lower trunion blocks, e.g., 8, mounted on base plate 9, each of which overlaps the lower portion of the corresponding upper trunnion block. Shaft 11 is closely fitted through the overlapping portions of the upper and lower trunnion blocks, and acts as a hinge for upper plate 6. The close fit of shaft 11 through the trunnion blocks limits the possible motion of plate 6 to a vertical direction only; all horizontal play is to be avoided insofar as possible. The upper surface of plate 6 carries a half-round bar 12 mounted with the curved surface uppermost along a line parallel to the axis of shaft 11 and close to the edge of plate 6. The drawing shows a mounting beam 13 fitted along its length with a number of stiffening plates, e.g., 10, for added rigidity. Beam 13 is positioned between bar 12 and plate 6, and is used in this particular embodiment to secure additional clearance between the ladle 5 and the edge of plate 6 by elevating the position of the ladle. The use of such a beam or other mounting block is optional; bar 12 may be mounted directly on plate 6 if desired.

Figure 2:
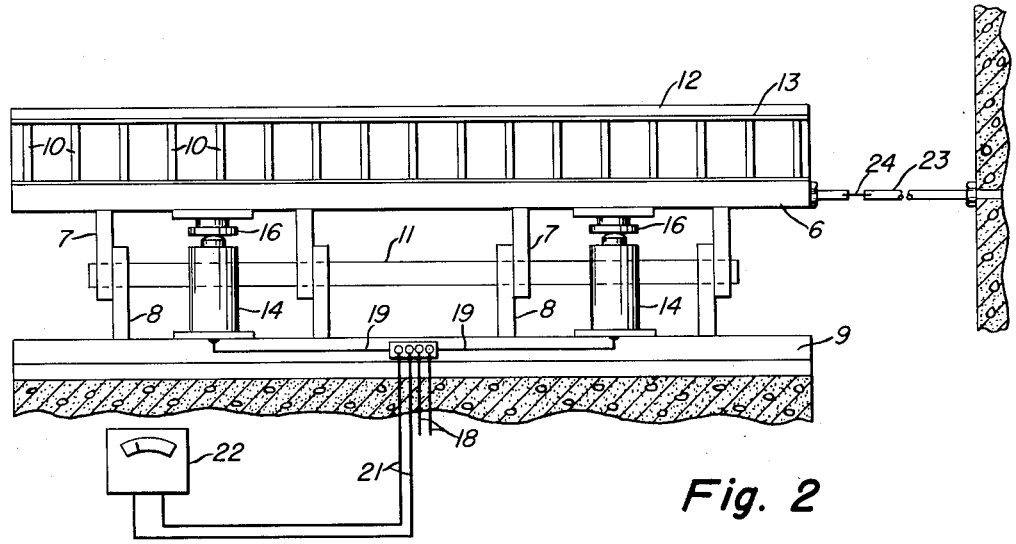
FIGURE 2 is a sectional view along the line 2—2 of FIGURE 1.

FIGURE 2 shows the positioning of the load cells used in this apparatus. Load cells such as those used herein are commercially available devices which produce a response of some kind (e.g., an electrical voltage or a hydraulic or pneumatic pressure) which is proportional to the load which is placed on the cell. Although pneumatic or hydraulic load cells can also be used in this invention, electric load cells are preferred. A typical electric load cell comprises a calibrated load-receiving column to which are bonded four fine wire strain gauges which are electrically connected to form a Wheatstone bridge circuit. In operation, a constant voltage is impressed across two corners of the bridge; the other two corners serve as output terminals. With no applied load the system is initially in electrical balance. When a load is placed on the cell, a deflection of the load-receiving column is caused resulting in a corresponding deflection of the strain gauges. This causes a resistance change; the bridge is no longer in balance and a voltage exactly proportional to the applied load appears across the output terminals of the cell. The output signal voltages of the cells are additive, so that two or more cells can be connected in series to produce a total voltage which is proportional to the total load on all the cells. The total output is fed to a suitable indicating device which may be a simple meter or an electronically-operated instrument such as is commonly used in modern industrial instrumentation.

Referring again to FIGURES 1 and 2, load cells 14 are mounted beneath and in contact with plate 6 along a line which is directly below the half-round bar 12. This arrangement insures that the load is applied directly over the load cell center at all times and obviates inaccuracies in weighing which might occur if a horizontal thrust component were applied to the cells. Bearing block 16 shown positioned between the bottom surface of plate 6 and the top of the load cells is optional, its function being to provide a smooth hard flat bearing surface. If desired, the bottom surface of plate 6 in contact with the load cell may be suitably prepared to act as the bearing surface, but this is in general not as convenient as using a separate bearing block.

The electric load cells 14 shown in FIGURE 2 are energized through wires 18 and multi-conductor cable 19, the output signal returning through cable 19 and wires 21 to a meter 22 or other similar instrument. The output signal from the load cells used in the other weighing assembly not shown in FIGURE 2 may be fed in series to the same meter 22, or if desired another corresponding meter can be used.

Figure 3:
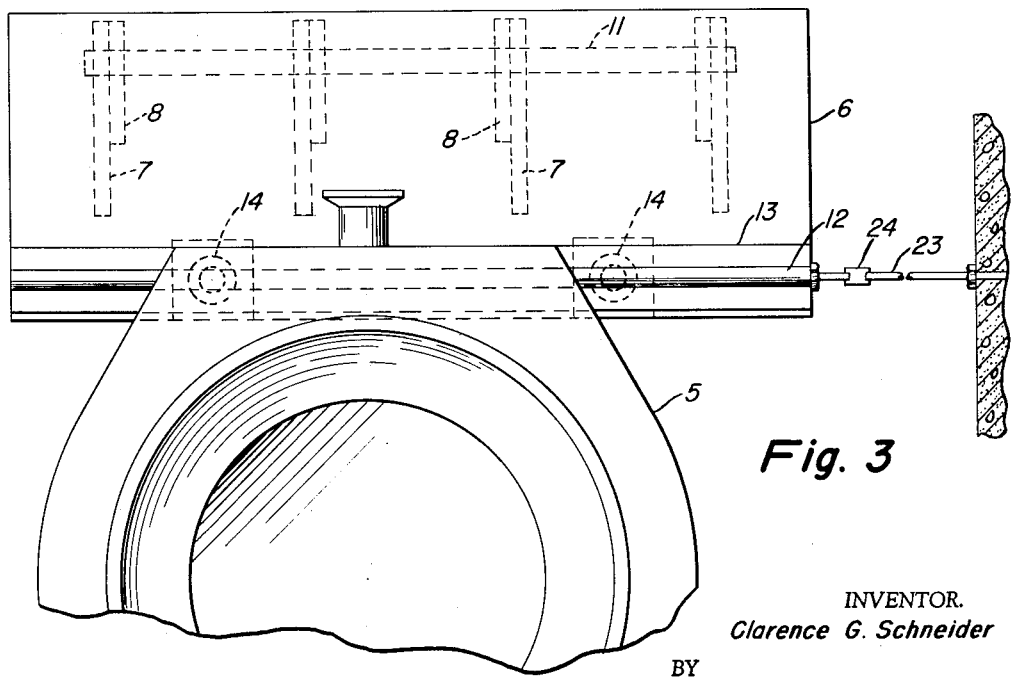
FIGURE 3 is a top view of one of the weighing assemblies, along the line 3—3 of FIGURE 1.

The close fit of shaft 11 through trunnion blocks 7 and 8 prevents any substantial movement of plate 6 in a horizontal direction. As an additional precaution against such movement, check-rod 23, shown in FIGURES 2 and 3, is used. Rod 23 is mounted horizontally and parallel to the axis of shaft 11 with one end connected to plate 6 and the other end rigidly imbedded in a suitable support, for example the wall of the surrounding structure as in the embodiment shown. Check-rod 23 must be flexible enough to offer no substantial resistance to vertical deflections of plate 6 while restraining movement in a horizontal direction. The rod shown has a thin metal coupon 24 intermediate its ends for providing the necessary flexibility. Other methods of accomplishing the same result will be apparent to those skilled in the art.

The number of load cells required in the apparatus of the invention obviously depends on the total load and the rated capacity of each cell. However, since cells having individual capacities up to 200,000 pounds are commercially available, more than four cells will not usually be needed except in extreme cases. If required, additional cells can be used in the same manner as those shown herein.

The apparatus of the invention has particular advantages for use in weighing molten metal ladles. It will be apparent, however, that any underslung load can conveniently be weighed with the herein disclosed weighing system.

The foregoing detailed description has been given for clearness of understanding only, and no unnecessary limitations should be understood therefrom, as modifications will be obvious to those skilled in the art.

What is claimed is:

1. A weighing apparatus for weighing an underslung load comprising two weighing assemblies in spaced relationship adapted to mount said load, each of said assemblies comprising in combination: a horizontally positioned rigid plate hinged about a horizontal axis; a half-round bar mounted on the upper surface of said plate along a line spaced from and parallel to said horizontal axis, said bar serving as a bearing element to which the load to be weighed is applied; a plurality of load cells mounted below and in contact with said plate along a line directly beneath said half-round bar; and means for measuring the total output signal of said load cells, whereby the load applied thereto can be determined.

2. A molten metal weighing apparatus comprising a molten metal ladle and two diametrically opposed weighing assemblies mounting said ladle, each of said assemblies comprising in combination: a rigid horizontal plate; hinge means attached to said plate, the axis of said hinge being horizontal; a straight half-round bar mounted on the upper surface of said plate along a line spaced from and parallel to the axis of said hinge, said bar serving as a bearing element to which the load to be weighed is applied; a pair of electric load cells mounted below and in contact with said plate along a line directly beneath said half-round bar; electrical circuit means for energizing said load cells; and means for measuring the total output signal of said load cells, whereby the load applied thereto can be determined.

3. A molten metal weighing apparatus comprising a molten metal ladle and two diametrically opposed weighing assemblies mounting said ladle, each of said assemblies comprising in combination: a rigid horizontal plate; hinge means for said plate comprising a plurality of upper vertical parallel trunnion blocks secured to the under surface of said plate, a plurality of lower vertical parallel trunnion blocks in fixed position, each of said lower trunnion blocks overlapping a corresponding upper trunnion block, and a close-fitting horizontal cylindrical shaft passing through circular holes in the overlapping portions of said upper and lower trunnion blocks; a straight half-round bar mounted on the upper surface of said plate along a line spaced from and parallel to the axis of said cylindrical shaft, said bar serving as a bearing element to which the load to be weighed is applied; a pair of electric load cells mounted below and in contact with said plate along a line directly beneath said half-round bar; electrical circuit means for energizing said load cells; and means for measuring the total output signal of said load cells whereby the load applied thereto can be determined.

4. The apparatus of claim 1 which includes a horizontal flexible check rod one end of which is connected to said plate and the other end of which is rigidly secured, the axis of said check rod being parallel to the axis of said hinge means.

References Cited in the file of this patent

UNITED STATES PATENTS

| | | |
|---|---|---|
| 1,579,658 | Pugh | Apr. 6, 1926 |
| 1,844,080 | Troll | Feb. 9, 1932 |
| 2,213,982 | Frey et al. | Sept. 10, 1940 |
| 2,343,229 | Stone et al. | Feb. 29, 1944 |
| 2,444,245 | Campbell | June 29, 1948 |
| 2,472,047 | Ruge | May 31, 1949 |
| 2,793,851 | Ruge | May 28, 1957 |

FOREIGN PATENTS

| | | |
|---|---|---|
| 457,295 | Great Britain | Nov. 25, 1936 |